United States Patent [19]

Helm

[11] 4,124,118
[45] Nov. 7, 1978

[54] ROTATIONAL RESTRAINT FOR A VIDEO DISC PACKAGE

[75] Inventor: James H. Helm, Elwood, Ind.

[73] Assignee: RCA Corporation, New York, N.Y.

[21] Appl. No.: 790,864

[22] Filed: Apr. 26, 1977

[30] Foreign Application Priority Data

Aug. 9, 1976 [GB] United Kingdom ............... 33097/76

[51] Int. Cl.² ........................................... B65D 85/30
[52] U.S. Cl. .................................... 206/310; 206/303; 206/472; 206/488; 206/493; 206/815
[58] Field of Search ................. 220/324; 206/1.5, 303, 206/309, 310, 311, 312, 313, 397, 405, 406, 413, 414, 444, 472, 474, 485, 488, 493, 815

[56] References Cited

U.S. PATENT DOCUMENTS

| | | | |
|---|---|---|---|
| 1,940,088 | 12/1933 | Harrison | 206/309 |
| 3,107,783 | 10/1963 | Corey et al. | 220/324 |
| 3,208,585 | 9/1965 | Hultgren et al. | 206/406 |
| 3,233,728 | 2/1966 | Johnson et al. | 206/493 |
| 3,297,154 | 1/1967 | Lyman | 206/405 |
| 3,638,788 | 2/1972 | Solomon | 220/324 |
| 3,737,067 | 6/1973 | Palson | 220/324 |
| 3,896,929 | 7/1975 | Mills | 206/493 |
| 4,076,119 | 2/1978 | Clarke | 206/309 |

FOREIGN PATENT DOCUMENTS 1,255,009 11/1971 United Kingdom ..................... 206/406

Primary Examiner—William Price
Assistant Examiner—Bruce H. Bernstein
Attorney, Agent, or Firm—Eugene M. Whitacre; Joseph S. Tripoli; Dilip A. Kulkarni

[57] ABSTRACT

The disclosure concerns a protective package for a video disc of the type having a pair of finger holes in the label area. The package includes a base member having a well for removably receiving the video disc. A pair of rotational restraints are secured to the base member for effecting engagement with the finger holes during the containment of the video disc in the well, such engagement preventing rotational motion of the video disc relative to the base member. A cover member is secured to the base member for enclosing the video disc in the well. Pursuant to another embodiment of the present invention, the rotational restraints are removably secured to the base member, instead of being integral therewith in accordance with the first embodiment.

4 Claims, 3 Drawing Figures

ROTATIONAL RESTRAINT FOR A VIDEO DISC PACKAGE

This invention relates generally to a video disc system, and more particularly to a protective package for a video disc.

BACKGROUND OF THE INVENTION

The United States Patent Application of James Hillier, Ser. No. 597,371, filed on July 18, 1975, and now U.S. Pat. No. 4,030,138, (as well as a counterpart British patent application No. 28054/76, filed July 6, 1976), discloses a disc record handling system. As disclosed in the aforementioned Hillier application, which is also assigned to the assignee of the instant application, a pair of finger holes are provided in the unrecorded label area of the record. The package used for shipping and storing the record is provided with a well for receiving the record. The spacing between the edge of the well and the outer periphery of the record is such that the outer periphery of the record is not directly accessible, thereby constraining the consumer to handling the disc by the finger holes. The package is provided with a finger cavity located underneath the finger holes to facilitate grasping of the record for removal from the package. Reference may be made to the Canadian Design Pat. No. 40,524 for an illustration of a preferred design of such finger holes for handling records.

In the aforementioned systems, it is desirable to prevent rotation of the record relative to the top and bottom of the package and, in the case of multiple record packages, it is advantageous to prevent rotation of records relative to each other. This is so because such rotation creates a scruffing condition on the surfaces of the records which detracts from their appearance, and also generates debris which could result in loss of signal during playback. The problem is particularly important in the case of video discs since video disc grooves are relatively fragile (e.g., groove depth 1 micrometer, groove pitch 4.5 micrometers), and since video disc signal elements are relatively small (e.g., signal element length 0.3 to 0.8 micrometer, signal element depth 0.10 micrometer).

SUMMARY OF THE INVENTION

Pursuant to the present invention, the protective package for a record, having finger holes in the label area, comprising a base member which has a well for receiving the record. Means are secured to the base member for engagement with the finger holes during containment of the record in the well to prevent rotational motion between the record and the base member. A cover member secured to the base member encloses the record in the well.

In accordance with another embodiment of the present invention, the rotational motion preventing means are removably secured to the base member.

DETAILED DESCRIPTION OF THE PREFERRED EMBODIMENT

Figure 1:
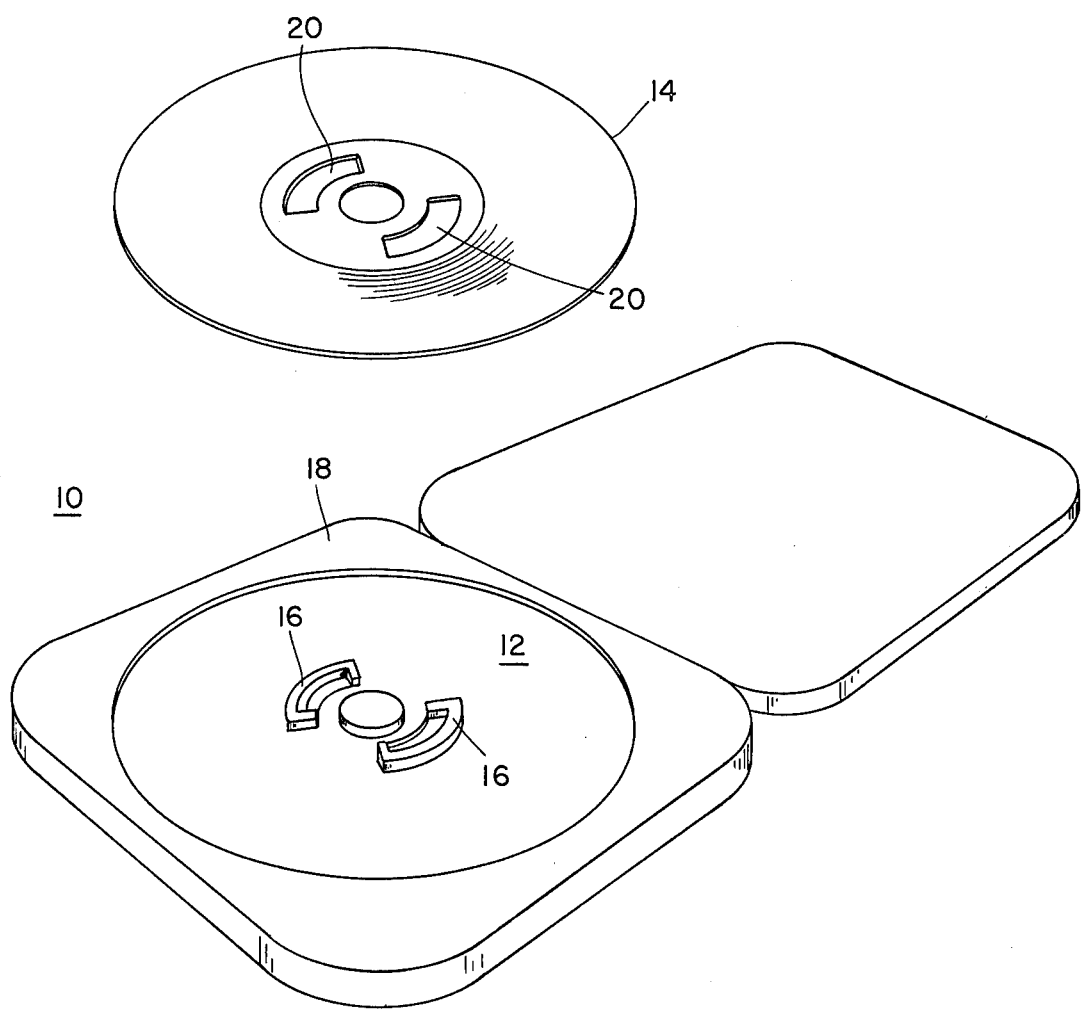
FIG. 1 shows a video disc package incorporating a first embodiment of the rotational restraint pursuant to the present invention.

As shown in FIG. 1, a video disc package 10 is provided with rotational restraints 12 to prevent a video disc 14 from rotating while in the package. The rotational restraints 12 comprise raised rib-like portions 16 secured to a base 18 of the package 10, and located in such a manner that when the video disc 14 is received in a well provided in the package, the rib-like portions engage the radial edges of the finger holes 20 of the video disc to prevent rotation of the video disc while in the package.

Figure 2:
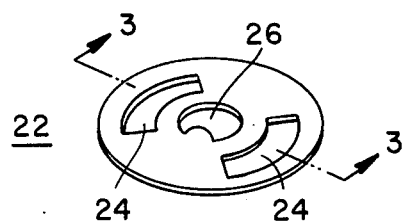
FIG. 2 illustrates a video disc package provided with another embodiment of the rotational restraint in accordance with the present invention.
Figure 2:
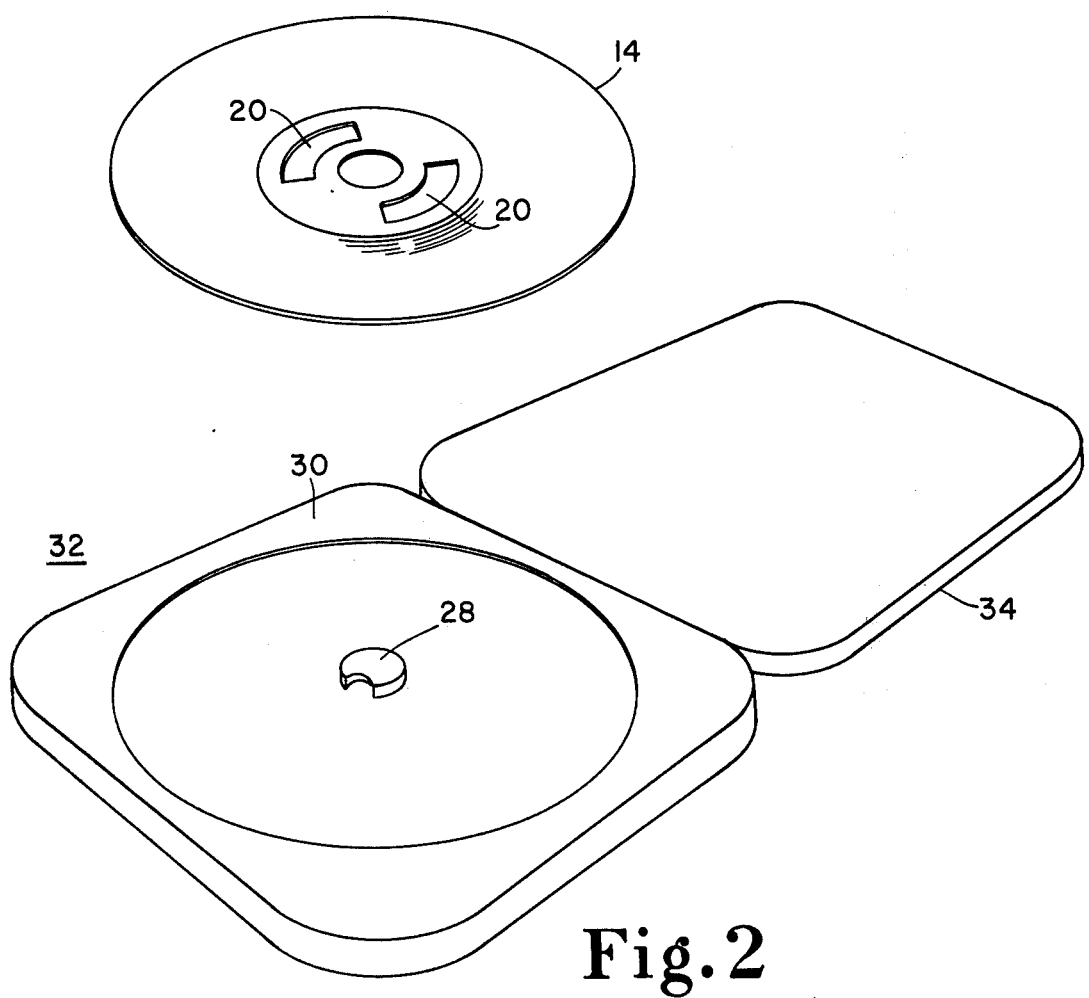

FIG. 2 shows a disposable rotational restraint device 22 in accordance with another embodiment of the present invention. The use of the disposable rotational restraint device 22 overcomes the problem of the consumer having to orient the video disc, in order to align the finger holes of the video disc with the rotational restraints of the package, each time the video disc is returned to the package, while, at the same time, prevents the video disc from rotating relative to the package (or relative to each other, in the case of multiple disc packages) during shipment of the video disc to the consumer.

As shown in FIG. 2, the disposable rotational restraint device 22 has depressed portions 24 for engagement with the finger holes 20 of the video disc 14, and a noncircular aperture 26 for receiving a noncircular center post 28 secured to a base 30 of a video disc package 32.

In operation, the video disc 14 is first placed in the well provided in the package 32, and then the disposable rotational restraint device 22 is placed thereon, so that the non-circular aperture 26 of the device receives the non-circular center post 28 of the package, and so that the depressed portions 24 of the device engage the finger holes 20 of the video disc to prevent rotation of the video disc in the package. The disposable rotational restraint device 22 is held in place by a cover 34 of the package 32, while the package is shut. The comsumer discards the disposable rotational restraint device 22 after opening the package 32, so that he does not have to orient the video disc 14, in order to align the finger holes 20 of the video disc with the rotational restraints of the package, each time the video disc is returned to the package.

Figure 3:
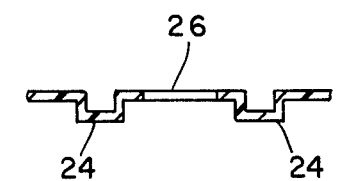
FIG. 3 shows a cross-sectional view of the rotational restraint of FIG. 2, the section being taken along the line 3—3 in FIG. 2.

FIG. 3 shows a sectional view of the disposable rotational restraint device 22 along a line 3—3 in FIG. 2. As indicated previously, the walls of the depressions 24 of the device 22 engage the finger holes 20 of the video disc 14 when the device is placed on the video disc to prevent rotation of the video disc relative to the device, while reception of the non-circular center post 28 in the non-circular aperture 26 prevents rotation of the device with respect to the package.

What is claimed is:
1. A record package assembly comprising:
  (A) a disc record having a central unrecorded region disposed between a centering aperture and an outer recorded region; said record having finger holes in said central unrecorded region which define rib portions, interposed between said finger holes and said centering aperture, and subject to finger grasping for facilitating record handling;

(B) a first member having a well for receiving said record and further having a non-circular post positioned for reception within the centering aperture of a record received in said well;

(C) removable means having a central opening dimensioned for engagement with the periphery of said noncircular post in a manner preventing rotational motion between said removable means and said first member, when said removable means is secured to said first member; said removable means including projecting portions dimensioned for engagement with walls of said finger holes for preventing rotational motion between a record and said removable means, when said removable means is secured to said first member during presence of said record in said well; and (D) a second member for enclosing said record in said well, when said members are juxtaposed.

2. A record package assembly as defined in claim 1 wherein said enclosure of said disc record by said second member in said well also serves to prevent removal of said removable means from said first member during said enclosure.

3. A record package assembly comprising:

(A) a disc record having a central unrecorded region disposed between a centering aperture and an outer recorded region; said record having finger holes in said central unrecorded region which define rib portions, interposed between said finger holes and said centering aperture, and subject to finger grasping for facilitating record handling;

(B) a first member having a well for receiving said record;

(C) a center post secured to said first member for reception within said centering aperture when said record is received in said well;

(D) disposable means having a central opening dimensioned for engagement with said post in a manner preventing rotational motion between said disposable means and said first member when said disposable means is secured to said post; said disposable means including projecting portions dimensioned for engagement with the walls of said finger holes such that rotational motion between said record and said disposable means is prevented when said disposable means is secured to said post subsequent to placement of said record in said well; and (E) a second member for enclosing said record in said well when said members are associated.

4. A record package assembly as defined in claim 3 wherein said center post has a non-circular outer periphery for engagement with a corresponding, non-circular inner periphery of said central opening in said disposable means for preventing rotational motion therebetween when said disposable means is secured to said center post.

* * * * *